Figure 1:
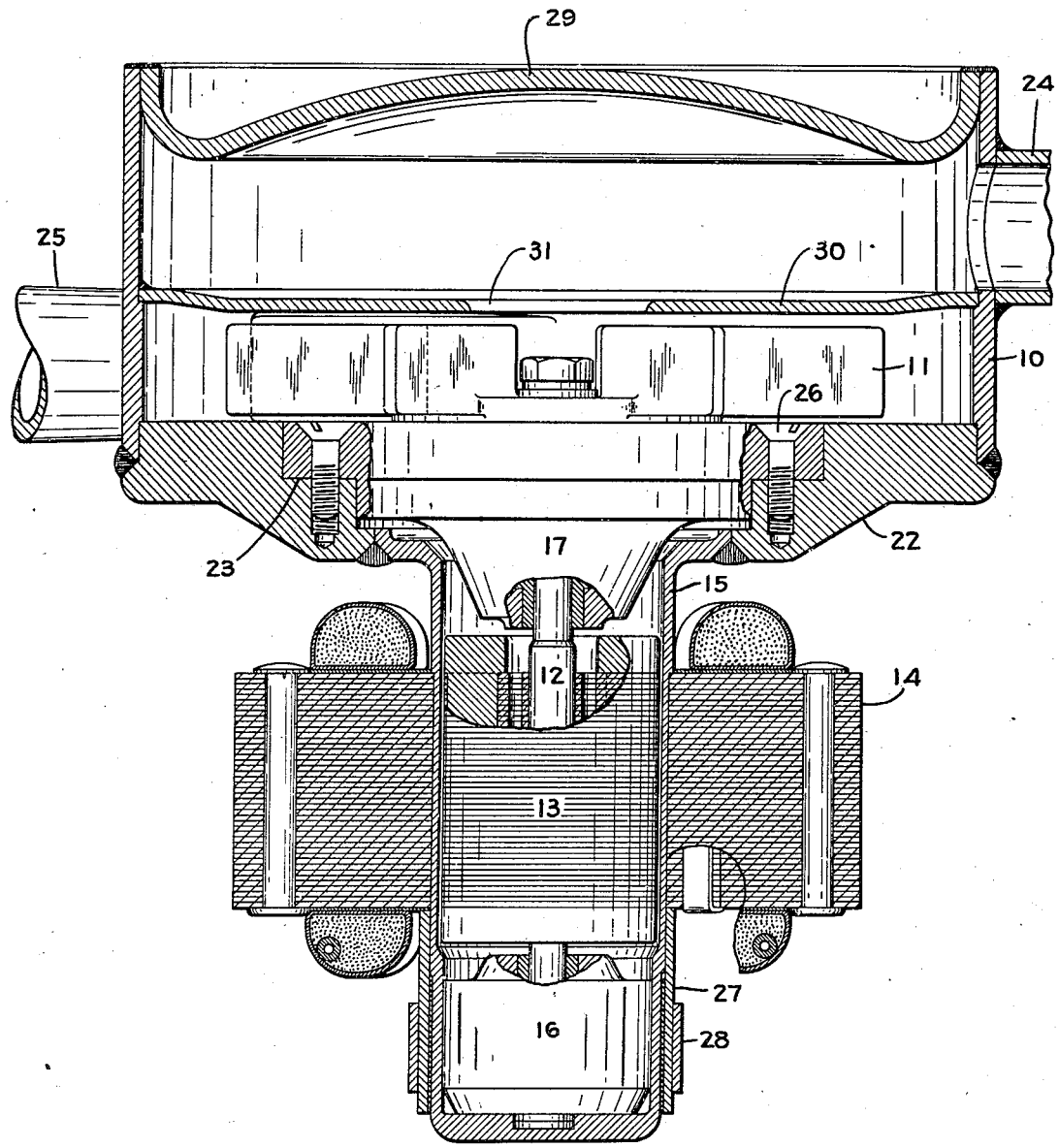

May 19, 1942.  E. C. ROGLIN  2,283,763
REFRIGERATION
Filed Jan. 17, 1941  2 Sheets-Sheet 1

INVENTOR
Ernest C. Roglin
BY
Harry S. Demarer
ATTORNEY

May 19, 1942.  E. C. ROGLIN  2,283,763
REFRIGERATION
Filed Jan. 17, 1941  2 Sheets-Sheet 2

INVENTOR
Ernest C. Roglin
BY
Harry S. DeMarsh
ATTORNEY

Patented May 19, 1942

2,283,763

UNITED STATES PATENT OFFICE 2,283,763

REFRIGERATION

Ernest C. Roglin, North Canton, Ohio, assignor to
The Hoover Company, North Canton, Ohio Application January 17, 1941, Serial No. 374,897

14 Claims. (Cl. 148—4)

This invention relates to a motor fan assembly for use in an absorption refrigerating apparatus of the type using an inert pressure equalizing medium, and more particularly to the method of constructing such a motor fan assembly.

There are many problems peculiar to the adaptation and use of an electric motor in a three-fluid absorption refrigerating apparatus which present serious constructional and economic problems to one desiring to devise a mode of constructing such an assembly which is simple in nature, capable of being performed by ordinary skilled labor, adaptable to mass production, economical, and which results in a minimum number of defective assemblies. The novel method of construction with which this invention concerns itself fulfils each of the foregoing requirements to an unusually high degree as will become apparent from the present disclosure.

In the present motor application it was deemed necessary to locate the field outside the refrigerating system and the rotor on the inside. Since refrigerating systems of the absorption type must be constructed to withstand internal pressures as high as 800 pounds per square inch to provide a working factor of safety, the strength of the system walls should be great at all points including the portion between the motor rotor and field. Therefore, the present invention provides a novel solution to a number of apparently irresolvable conflicting factors. For example, efficient motor design requires that the space between the rotor and the field structure be a minimum, and at the same time the application of the motor to an absorption refrigerating apparatus requires that the portion of the wall between the rotor and stator be of maximum strength.

Still another example of the problems solved by this invention is the following: The only material suitable for the construction of absorption refrigerating systems in large quantities is steel. This material is of course highly magnetic which is an advantageous property for that part of the material providing a flux path between the field and the rotor of the motor, but is disadvantageous for other portions of the system walls. Thus in using steel for such purposes, its desirable magnetic properties for certain portions of the motor-fan assembly are opposed by its undesirable magnetic properties for other portions of this assembly.

It is an object of this invention to provide a novel method of constructing a motor fan assembly suitable for circulating inert gas in an absorption refrigerating apparatus of the general type illustrated for example in a United States application for Letters Patent of Curtis C. Coons and Rudolph S. Nelson, Serial No. 118,284, filed December 30, 1936, which issued on April 29, 1941, as U. S. Patent No. 2,240,173.

More particularly, it is an object of this invention to provide an improved method of fabricating a hermetically sealed motor fan assembly in which a shell of novel construction is interposed between the rotor and field of the motor, and in which the shell is so constructed and arranged as to form an integral part of the refrigerating system itself. More specifically, this shell comprises a thin section of magnetic material between the stator and rotor and sections of non-magnetic material on either side thereof.

A further object of the invention is to employ materials for the construction of the shell which are highly resistant to the corrosive action of the working mediums within the refrigerating system, which have the necessary strength characteristics to withstand the high internal pressures of the system, which have the necessary magnetic properties and which also can be hermetically joined to and as a part of the walls of the refrigerating apparatus.

Still another object of this invention is to provide a method of construction for a motor fan assembly in which the internal parts are separated from the external parts by a completely machined shell which is then so treated as to render portions thereof magnetic and other portions non-magnetic. More particularly, it is an object to provide a shell of the character just described in which the internal parts can be inserted permanently with a minimum of difficulty, and in which the external parts can be assembled and disassembled with the minimum of difficulty and without otherwise disturbing the refrigerating system.

In an absorption refrigerating apparatus of the type under consideration the metal which forms the walls of the apparatus must be of high tensile strength and be highly resistant to corrosion and at the same time portions of the shell between the stator and rotor must have a high permeability (i. e., be highly magnetic) and other portions must have a high reluctance (i. e., be highly non-magnetic).

I have discovered that a highly satisfactory motor shell for the purposes above described can be formed of a single piece of certain steels which have properties such that all or any part can be changed to either a magnetic or a non-magnetic phase by proper treatment. Accordingly, I have found that a unitary shell for separating the rotor from the stator can be made of a single piece of steel, completely machined and thereafter this shell can be so treated that the desirable magnetic and non-magnetic properties can be obtained without distorting the shell from its finished form and without any subsequent machining operation. In this way, the portion of the shell which is to be positioned between the rotor and stator can be retained in its magnetic state and the portions at either end thereof transformed by suitable treatment into a non-magnetic state.

The principal object of this invention is therefore the method of producing a shell for separating the rotor from the stator of an induction motor, from a single homogenous piece of magnetic steel, and so treating portions of the shell to render them non-magnetic and to retain other portions in a magnetic state.

Certain alloy steel such as nickel steel, chromium steel, manganese steel or nickel chromium steel have high tensile strength, are highly resistant to the corrosive action of ammonia and can be treated so as to render portions thereof either magnetic or non-magnetic as desired.

Other objects and advantages of the invention will become apparent as the description proceeds when taken in connection with the accompanying drawings in which, Figure 1 is a cross-sectional view of a motor fan unit made in accordance with the procedure of the present invention.

Figure 2:
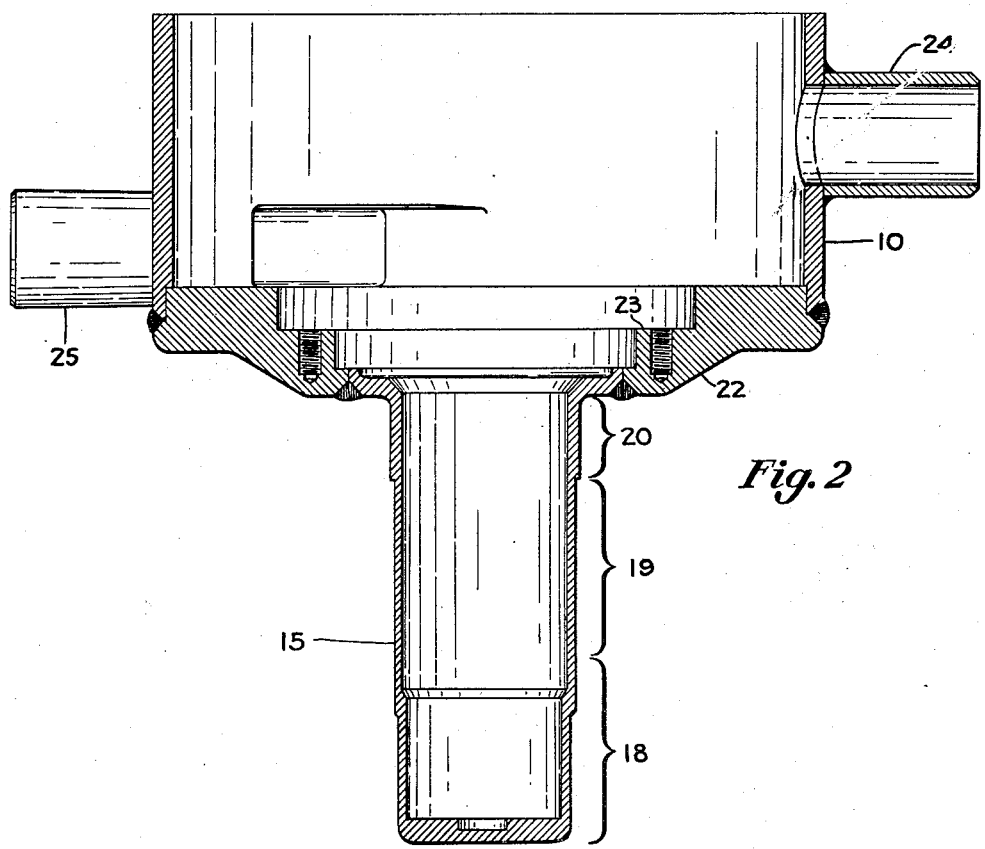

Figure 2 is a longitudinal sectional view of the motor fan housing of Figure 1 depicting the magnetic and non-magnetic portions thereof.

Figure 3:
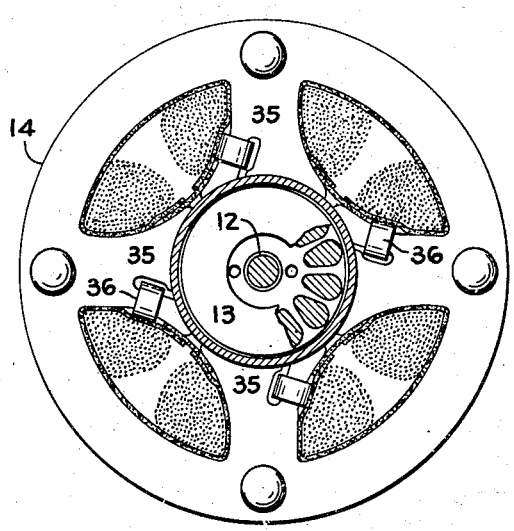

And Figure 3 is a cross-sectional view through the motor rotor and stator.

Referring to Figure 1, the motor fan unit comprises a fan housing 10, housing an impeller fan 11, connected by a shaft 12 to an induction rotor 13. The motor rotor is separated from the field structure 14 by a thin shell 15. The fan and rotor are positioned for rotation within the shell and fan casing, by a lower bearing assembly 16 and an upper bearing assembly 17 which are not shown in detail. The rotor 13 may be made of stainless steel laminations with cast aluminum conductor bars and end rings forming a well known squirrel cage rotor.

The shell 15 is made of a homogeneous closed-end tube of high strength stainless steel so treated in a manner to be more fully explained hereinafter, that the end sections 18 and 20 have non-magnetic properties and the section 19 between the rotor 13 and the stator 14 has magnetic properties. Thus, the sections 18 and 20 will have high reluctance and low permeability, and the section 19 high permeability and low reluctance.

In absorption refrigerating apparatus of the type hereinbefore referred to, the internal pressure sometimes goes beyond 350 pounds per square inch. The internal pressure being substantially equalized throughout all parts of the apparatus, only a small power unit is needed to circulate the mediums in the apparatus. Therefore, the power input for the motor may be as low as 12 to 15 watts. It can therefore be seen that the section of the shell 19 between the stator and rotor must have the best magnetic properties possible combined with high strength and maximum corrosion resistant properties. The making of the portion of the shell 19 between the rotor and stator of magnetic material reduces the effective air gap between the rotor and stator and the making of the end sections 18 and 20 of non-magnetic steel prevents magnetic flux leakage from the field to other parts of the system.

The shell 15 may be machined from a solid piece of stainless steel or may be stamped from a piece of cold rolled stainless steel. In either case the shell is rough machined on the interior of section 18 and the interior and exterior of section 19, and on the interior of section 20. The overall dimension of such motor rotors is less than one and one-half inches; the clearance between the rotor and stator is only a few thousandths of an inch, and the tolerances allowed in machining are of the order of a fraction of a thousandth of an inch. It is therefore necessary that the various parts be assembled and machined very carefully so that the parts will be lined up properly when completed.

After the rough machining operation the shell 15 is welded to the bottom plate 22 of the fan casing 10 and this unitary assembly is then placed in any suitable turning machine and the internal diameter of the section 18 machined to the proper diameter. The sections 19 and 20 are then machined on the interior to a slightly larger diameter than that of the section 18. The bottom plate 22 of the fan housing is also machined to form a seat 23 for the upper bearing assembly 17 of the motor fan rotor. The exterior of the section 19 is also machined to provide for the assembly of the field structure 14.

After all the machining operations above referred to are performed, the shell 15 may be treated to render the sections 18 and 20 non-magnetic and the section 19 magnetic in a manner to be more fully described hereinafter.

Since the power input to such motors is so small it is essential that section 19 be made as thin as possible so that excess losses will not be caused by eddy currents. In practice, the section 19 is made about 0.020 inch thick. When the field structure is assembled it will support the shell against the internal pressure within the apparatus. The shell being of magnetic material at this point will in reality form a part of the magnetic circuit of a motor and being very thin will not cause excessive losses.

Machining the interior of the sections 19 and 20 larger than that of section 18 facilitates the assembly of the lower bearing assembly 16 and the assembly of the motor fan rotor into the interior of the casing. The remainder of the fan housing 10 may then be secured to the bottom plate 22 by any suitable means such as by welding, or it may if desired, be welded to the bottom plate 22 before the machining operation, in which case the annular portion of the casing may be machined at the same time on the interior to form a seat for the plate 30.

Inlet and outlet conduits 24 and 25 are also welded to the fan housing 10 so as to provide means for the ultimate welding of the casing to the conduits of a refrigerating system such as shown in the aforementioned application. In assembling the rotor and stator, the lower bearing assembly 16 is inserted through the enlarged sections 19 and 20 into the reduced bore of the section 18 and press fitted therein. The motor fan rotor assembly including the upper bearing assembly 17 is then inserted axially into the shell and fan casing with the lower end of the shaft positioned in the lower bearing assembly 16 and the upper bearing assembly 17 positioned on the seat 23. The upper bearing assembly 17 may then be secured to the bottom plate 22 by any suitable means such as by screws 26. The field structure 14 may then be slid over the reduced end portion 18 onto the machined portion of the section 19 and press fitted thereon. To assure that the field structure 14 will not become removed from the magnetic annulus 19 and to position it at the proper position thereon, a supporting ring 27 is provided which is held in position by a clamping ring 28.

The fan chamber 10 is separated into a suction chamber and compression chamber by a plate 30 having an opening 31 leading to the suction side of the fan. This plate is welded to the interior of the casing 10 after which the fan chamber may be closed by any suitable means such as by welding a cover 29 thereto.

After the field 14 is positioned over the section 19 to support it against internal pressure and the cover 29 welded to the fan casing, the whole assembly is tested for leaks under hydraulic pressure of 800 pounds per square inch.

The rotor 13 of this type of motor is between 1¼ and 1⅓" in diameter and the power input to the field structure 14 is in the neighborhood of some 12 to 15 watts. It can therefore be seen that it is essential that the section 19 of the shell between the rotor and stator remain as thin as possible consistent with retaining the high pressure within the system. It can also be seen that since this rotor is of such a small size the machining tolerances will be in the order of fractions of thousandths of inches.

The magnetic section 19 in effect forms part of the field structure 14, since having high permeability and low reluctance, the magnetic lines of force will pass through it easily. In addition the section 19 forms a part of the mechanical structure of the housing as does the field structure 14 itself since it supports the magnetic annular section 19 against internal pressure.

As shown in Figure 3 the field structure 14 is of the closed yoke salient pole type having poles 35 with shading coils 36. In fractional horsepower motors of this type, it has been found that the motor has better running characteristics if the gaps between adjacent pole tips are closed by a magnetic bridge so that the poles totally embrace the rotor. In addition to performing the functions previously enumerated, the magnetic section 19 also forms a magnetic bridge between the tips of adjacent poles 35 and thereby improves the running characteristics of the motor.

Pure iron is strongly magnetic at room temperature but if heated to approximately 1650 degrees Fahrenheit it will become non-magnetic. On cooling below this critical or transformation temperature, it will regain its magnetic properties. Each time it passes through this critical temperature, it will repeat this change from magnetic to non-magnetic or from non-magnetic to magnetic. The magnetic form of iron ordinarily existing at low temperatures is called ferrite. The non-magnetic form of iron stable at elevated temperatures is called austenite.

It is these phase changes from ferritic to austenitic iron on heating and from austenitic to ferritic on cooling that makes possible the treatment of certain alloyed steels such as those mentioned above to change them from magnetic to non-magnetic or from non-magnetic to magnetic. In certain instances, by quenching, some of these changes may be retarded or prevented and structures and properties may be secured which are not found in slowly cooled steel.

In pure iron or in unalloyed carbon steel, the change from the non-magnetic to the magnetic condition occurs at a relatively high temperature where the metal is quite plastic and is so rapid that not even the most severe quench will entirely prevent it. However, by the addition of certain alloying elements to steel, particularly nickel, manganese and chromium, it is possible to lower the transformation point to temperatures even below room temperature and also to slow down the transformation rate to such an extent that a relatively mild quench, even air cooling will retain structures which are non-magnetic at ordinary temperatures.

Another effect of the alloy additions is to increase the hysteresis range. With finite rates of heating and cooling the phase change from non-magnetic to magnetic will occur at a lower temperature than the phase change from magnetic to non-magnetic. While the extent of this hysteresis range varies with the speed of heating or cooling, it is only a few degrees with plain carbon steel, but can be increased to several hundred degrees by certain alloying elements, particularly nickel and manganese. If this hysteresis range exceeds approximately 100° C., the alloy is usually called irreversible, which means that for a certain temperature range depending upon the alloy, the magnetic as well as certain other properties depend entirely upon whether this range is approached from above or from below.

When the non-magnetic to magnetic transformation temperature is depressed below room temperature by alloy additions this transformation may be brought about by chilling the steel to a very low temperature, and since these steels are irreversible they will remain magnetic when reheated to room temperature or somewhat higher.

In alloy steel in which the critical temperature is reduced to around 900 degrees Fahrenheit, the non-magnetic phase may be retained by quenching from above the critical temperature. In such alloy steels the phase change is prevented principally by the rigidity of the material which prevents the rearrangement of the atoms and which rearrangement would otherwise occur during the phase change. Any condition which would increase the mobility of the atoms will produce either a partial or complete transformation to the stable magnetic phase. Cold working with its distortion of the lattice and development of slip planes is one condition which will permit the transformation to proceed.

As previously pointed out, the addition of manganese is very effective in lowering the transformation point, and in retarding the rate of transformation. Carbon has a similar though much less pronounced effect. However, when carbon and manganese are combined, the effect is much more than additive. This is also important because carbon is one element that can easily be added by carburizing after all other operations are completed, and the carburizing action can be stopped off from such sections by proper plating or covering with certain special compounds.

By utilizing the above principle and induction heating, it is possible to form the steel shell between the stator and rotor of a single piece of homogeneous alloy steel and treat certain portions thereof so as to render them magnetic or non-magnetic as desired after all the machining operations have been performed.

By the use of induction heating the portion of the shell which is to be changed from one phase to another can be brought to a temperature high enough to produce the transformation in a matter of seconds and since the heating takes place within the body of the metal itself a sharp line of demarcation between the portion of one phase and the portion of another phase can be maintained.

There are a number of ways in which the stainless steel shell 15 may be treated to render the portions 18 and 20 non-magnetic and the section 19 magnetic.

If an irreversible steel is selected which has a critical temperature below room temperature, it is possible to treat the entire shell 15 by cooling it to a very low temperature for a period of time, for example, by the use of dry ice until the entire shell has been transformed from a non-magnetic phase to a magnetic phase in the manner previously described. The sections 18 and 20 are then quickly heated by induction heating to a temperature in the neighborhood of 600 degrees centigrade in a manner to be described more fully hereinafter which will transform the sections 18 and 20 from the magnetic phase back to the non-magnetic phase. Examples of steel having the above described properties are chromium nickel steel having approximately 17.5% chromium and 5% nickel and nickel steel having 25% nickel with the balance iron.

If the shell 15 is made of an irreversible steel having a critical temperature below room temperature such as the steels above mentioned, the cold working operation will facilitate the transformation from non-magnetic to magnetic. In this case the entire shell 15 should be formed by a cold working operation except for the final machining, which cold working operation will realign the atoms so as to transform the shell from a non-magnetic phase to a magnetic phase. After this the sections 18 and 20 could be subjected to the induction heating process above mentioned to re-transform them from the magnetic phase to the non-magnetic phase.

In the example just mentioned the original transformation from non-magnetic to magnetic could be further facilitated by the cooling process mentioned above, after which the sections 18 and 20 could be re-transformed to the non-magnetic phase by induction heating as before.

When the irreversible steels just mentioned are treated as indicated it is not essential that the sections 18 and 20 be quenched after the induction heating but as a practical matter in order to maintain a sharp line of demarcation between the non-magnetic and magnetic sections the shell 15 should be quenched after the heating operation so as to prevent the heat being conducted to the magnetic section 19.

If an alloy steel is selected which is magnetic at ordinary temperatures and has a critical temperature of around six hundred degrees Fahrenheit and the steel is irreversible, the shell 15 may be formed in any suitable manner as previously described and the end sections 18 and 20 subjected to induction heating as before which will transform the sections 18 and 20 from the magnetic phase into the non-magnetic phase. In this operation a quenching operation is necessary after the induction heating and as before is necessary to maintain a sharp line of demarcation between the non-magnetic and magnetic sections.

When the shell 15 is made of a reversible stainless steel such as an alloy steel having 2.0 percent carbon and 12 to 14 percent chromium the sections 18 and 20 could be subjected to the induction heating operation and quickly quenched to prevent the atoms from re-aligning themselves upon cooling and thereby maintain the end sections 18 and 20 in the non-magnetic phase.

Another method of making portions of the shell 15 non-magnetic and the remainder magnetic is by the carburizing process previously mentioned. In this case the shell 15 should be made of an alloy steel containing approximately —0.4 percent carbon and 8 percent manganese. The shell is formed in any suitable manner as before, the section 19 which is to be maintained in a magnetic phase is copper plated and the whole shell subjected to a carburizing process in any manner well known in the art. The carburizing process will carburize the end sections 18 and 20 and change them from the magnetic to the non-magnetic phase while the section 19 which is copper plated will remain magnetic. If deemed necessary, the copper plating can be removed after the carburizing process. However, this is not absolutely essential since the copper plating on the interior will be removed by the ammonia atmosphere in the system and the copper plating on the exterior will not affect the magnetic properties of the section 19 to any great extent.

In each of the examples just given it is to be noted that the atoms in the end sections 18 and 20 are rearranged by the process to which the shell was subjected. This is true in both the induction heating process and the carburizing process and is in reality what changes the metal of the sections from the magnetic phase to the non-magnetic phase. The induction heating process previously mentioned is carried out in the following manner: The sections 18 and 20 which are to be rendered non-magnetic are placed within a circular inductor of copper, which may be a solid coil or a ring of copper which is subjected to an alternating current of high frequency, such as 2,000 to 10,000 cycles and upward. The high frequency current flowing through the inductor will produce a high frequency magnetic field within the region of the inductor.

The steel of the sections 18 and 20 being originally in the magnetic phase, the molecules within the steel will attempt to align themselves with the polarity of the field and with this field changing thousands of times per second, an enormous amount of internal molecular friction is developed as the result of the natural tendency for the steel to resist the changes. In this manner, the electrical energy is transformed through the medium of friction into heat.

The frictional action producing the heat is called hysteresis and is dependent upon the magnetic qualities of the steel. Thus when the temperature has passed the critical point at which the steel becomes non-magnetic, all hysteresis heating ceases. There is an additional source of heat due to eddy currents which flow as a result of the flux changes. The resistance of the steel increases with temperature so that the intensity of this action is decreased as the steel becomes heated and is only a fraction of its cold original value when the proper temperature is reached.

When the temperature of the inductively heated steel of the sections 18 and 20 reaches the critical value, all heating due to hysteresis ceases and that due to eddy currents continues at a greatly reduced rate. This action takes place with the greatest intensity on the surface layers of the steel and when the upper layer has become non-magnetic the lines of force naturally tend to flow through the next succeeding layer below and that layer also will be heated to the critical temperature. With continued application of power, a gradual penetration of the heated area takes place, since as each layer of steel is brought to temperature the magnetic field shifts to the layer beneath which offers the lower resistance.

It will thus be obvious that by the selection of the proper frequency and control of the power and heating time, it will be possible to make the sections 18 and 20 non-magnetic throughout their entire thickness.

At this point it may be mentioned, that if necessary, a second induction heater may be positioned on the interior of the shell at the sections 18 and 20 to augment the action of the inductor on the exterior.

The inductors may be provided with orifices for leading a quenching fluid to the metal, which quenching fluid will be supplied immediately the inducing current is shut off.

The induction heating process requires only a few seconds for its completion since the sections 18 and 20 are comparatively thin. By proper regulation of the control, the heating and quenching will require only a few seconds.

Due to the fact that the induction heating takes place in the metal of the shell itself, the heating operation takes only a few seconds and the metal is quenched immediately upon the cessation of the heating operation, a sharp line of demarcation can be maintained between the magnetic section 19 and the non-magnetic sections 18 and 20.

It is not absolutely necessary that the entire section 18 be made non-magnetic, the only requirement being that a portion thereof such as a short annulus adjacent the section 19 be made non-magnetic so as to reduce the flux leakage across adjacent pole tips.

By a proper regulation of the frequency used, the amount of power supplied to the inductors and the time of heating, any thickness of shell desired can be made non-magnetic throughout, but since the shell is of very small diameter and the sections 18 and 20 are comparatively thin, only a few seconds is required for the heating operation.

In addition to maintaining a sharp line of demarcation between the magnetic and non-magnetic sections, the induction heating method also has the advantage that there is no scale formation. Since the heating is so rapid there is no warpage of the metal and the shell can be completely machined before the heating operation.

The inductor may be a solid copper block cut to fit the shell or copper tubing shaped for the same purpose and provided with orifices therethrough to the interior surface so that the quenching fluid can be supplied to the surface of the shell immediately the heating ceases.

By each of the processes hereinbefore outlined, the entire motor fan casing can be completely machined and the shell treated so as to transform the sections 18 and 20 into the non-magnetic phase while retaining the section 19 in the magnetic phase. The section 19 will perform its mechanical function of forming a portion of the wall of the apparatus and its electrical function as forming a portion of the magnetic path of the field structure as well as forming a bridge between adjacent pole tips to improve the running characteristics of the motor. The sections 18 and 20 will also perform an electrical function as well as a mechanical function in that they will prevent magnetic flux leakage between adjacent poles as well as prevent flux leakage to other parts of the refrigerating system.

From the foregoing it can be seen that this invention provides a simple method of making a shell of a power unit for a refrigerating system in which the shell separates the rotor from the stator, has a magnetic section beneath the field structure and non-magnetic sections at each end thereof, whereby only a single piece of metal need be utilized and the sections made magnetic and non-magnetic without the necessity of securing the adjacent sections to each other. This is very important in absorption refrigerating machines, since it produces a shell of high strength which is resistant to corrosion by the fluids normally contained in the system and which is not liable to leak when assembled with the refrigerating apparatus.

While only a few embodiments of the invention have been shown and described, it is to be understood that these embodiments are to be taken as illustrative only and not in a limiting sense. I do not wish to be limited to the specific embodiments described but to include all equivalent variations thereof, except as limited by the scope of the claims.

It is to be understood that the protection herein applied for is not confined to the particular combinations of features and elements set out in the following claims. Protection is herein applied for for any one or more of the features or elements referred to in the following claims, or described in the foregoing specifications or shown in the accompanying drawings, either independently or in combination.

I claim:

1. The method of making a unitary shell for separating the rotor and stator of a dynamo electric machine which comprises treating the end sections of a shell in which the iron is in a ferritic state to change the iron in the end sections into an austenitic state.

2. The method of making a unitary shell for separating the rotor and stator of a dynamo electric machine comprising treating the end sections of a one-piece steel shell to so arrange the atoms that the end sections will become non-magnetic while the central section remains magnetic.

3. The process of making a unitary shell for separating the stator and rotor of a dynamo electric machine comprising treating the end sections of a steel shell by induction heating to transform the metal of the end sections from a magnetic to a non-magnetic phase.

4. The process of making a unitary shell for separating the rotor and stator of a dynamo electric machine comprising treating the end sections of a steel shell to a carburizing process to transform the metal of the end sections from a magnetic to a non-magnetic phase.

5. The process of making a unitary shell for separating the rotor and stator of a dynamo electric machine comprising subjecting a shell of alloy steel having a critical temperature below room temperature to a sufficiently low temperature to transform the metal of the shell to a magnetic phase and subjecting sections of the shell to a sufficiently high temperature to re-transform the metal of said sections to a non-magnetic phase.

6. The process of making a unitary shell for separating the rotor and stator of a dynamo electric machine comprising subjecting a shell of alloy steel having a critical temperature below room temperature to a cold working process to transform the metal of the shell to a magnetic phase and heating sections of the shell to a temperature sufficient to re-transform the metal of said sections to a non-magnetic phase.

7. The process of making a unitary shell for separating the rotor and stator of a dynamo electric machine comprising subjecting a shell of alloy steel having a critical temperature below room temperature to a cold working process to transform the metal of the shell to a magnetic phase, subjecting said shell to an extremely low temperature to augment the transformation of the metal of the shell to a magnetic phase and heating sections of the shell to a temperature sufficient to retransform the metal of said sections to a non-magnetic phase.

8. The process of making a unitary shell for separating the rotor and stator of a dynamo electric machine comprising heating sections of a reversible alloy steel to above its critical temperature by an induction heating process to transform the metal of said sections to a non-magnetic phase and quenching said shell to fix the metal of said sections in a non-magnetic phase.

9. The process of making a unitary shell for separating the rotor and stator of a dynamo electric machine comprising coating the central section of a shell of alloy steel with a material resistant to a carburizing process, and treating the shell to a carburizing process whereby the metal of the end sections are transformed to a non-magnetic phase and that of the central section remains in a magnetic phase.

10. The process of making a unitary shell for separating the rotor and stator of a dynamo electric machine comprising machining a shell of magnetic alloy steel to final size, heating the end sections of said shell by induction heating to a temperature sufficient to transform the metal of the end sections to a non-magnetic phase and quenching said shell whereby the machined shell is not warped and the heat applied to the end sections is not conducted to the central section.

11. The process of making a unitary shell for separating the rotor and stator of a dynamo electric machine comprising machining the sections of a shell of magnetic alloy steel to final size, treating the end sections of said shell by a process which will transform the metal of the end sections into a non-magnetic phase without warping the machined portions of the shell.

12. The process of making a hermetically sealed motor fan casing for an absorption refrigerating apparatus in which the stator is positioned exteriorly of the casing and the rotor interiorly thereof comprising rough forming the fan casing, rough forming a unitary shell for separating the rotor from the stator of a magnetic stainless steel alloy, welding the shell to the fan casing, finish machining surfaces of the shell and fan casing and treating the end sections of the shell to a process which will transform the metal of the end sections into a non-magnetic phase without warping the machined surfaces.

13. The process of making a unitary shell for separating the rotor and stator of a dynamo electric machine comprising treating a shell of magnetic stainless steel having a critical temperature appreciably below the plastic state of the metal by induction heating at the end sections of the shell to a temperature above the critical temperature to transform the metal of the end sections into a non-magnetic phase, and quenching the shell to fix the metal of the end sections in a non-magnetic phase.

14. The process of making a hermetically sealed motor fan casing for an absorption refrigerating apparatus in which the stator is positioned exteriorly of the casing and the rotor interiorly thereof comprising rough forming the fan casing, rough forming a unitary shell for separating the rotor from the stator from a magnetic stainless steel alloy having a critical temperature appreciably below the plastic state of the metal, welding the shell to the fan casing, finish machining surfaces of the shell and casing, heating the end sections of the shell by induction heating to a temperature above the critical temperature of the metal to transform the metal of the end sections into a non-magnetic phase and quenching the shell whereby the heat applied to the end sections will not be conducted to the central section and the machined surfaces will not be warped.

ERNEST C. ROGLIN.